US008838454B1

(12) United States Patent
Thenthiruperai

(10) Patent No.: US 8,838,454 B1
(45) Date of Patent: Sep. 16, 2014

(54) TRANSFERRING VOICE COMMAND PLATFORM (VCP) FUNCTIONS AND/OR GRAMMAR TOGETHER WITH A CALL FROM ONE VCP TO ANOTHER

(75) Inventor: Balaji S. Thenthiruperai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 3214 days.

(21) Appl. No.: 11/010,054

(22) Filed: Dec. 10, 2004

(51) Int. Cl.
*G10L 21/00* (2013.01)
*G10L 15/00* (2013.01)
*G10L 15/26* (2006.01)
*G10L 17/00* (2013.01)
*G10L 21/06* (2013.01)

(52) U.S. Cl.
USPC ........ 704/270.1; 704/231; 704/235; 704/246; 704/270; 704/271; 704/275; 704/276; 704/277

(58) Field of Classification Search
USPC .............. 704/271, 270.1, 275, 231, 277, 270, 704/235, 246, 276; 717/127; 379/88.18, 71, 379/265.06
See application file for complete search history.

(56) References Cited

U.S. PATENT DOCUMENTS

| | | | |
|---|---|---|---|
| 5,029,199 A | 7/1991 | Jones et al. | |
| 5,471,521 A | 11/1995 | Minakami et al. | |
| 5,668,854 A | 9/1997 | Minakami et al. | |
| 5,729,600 A | 3/1998 | Blaha et al. | |
| 6,044,142 A | 3/2000 | Hammarstrom et al. | |
| 6,163,535 A | 12/2000 | Jordan et al. | |
| 6,229,880 B1 | 5/2001 | Reformato et al. | |
| 6,304,645 B1 | 10/2001 | Holland et al. | |
| 6,335,964 B1 | 1/2002 | Bowater et al. | |
| 6,353,608 B1 | 3/2002 | Cullers et al. | |
| 6,373,939 B1 | 4/2002 | Reese et al. | |
| 6,396,909 B1 | 5/2002 | Reksten et al. | |
| 6,418,201 B1 | 7/2002 | Holland et al. | |
| 6,421,427 B1 | 7/2002 | Hill et al. | |
| 6,459,788 B1 | 10/2002 | Khuc et al. | |
| 6,473,505 B1 | 10/2002 | Khuc et al. | |
| 6,480,599 B1 | 11/2002 | Ainslie et al. | |
| 6,512,818 B1 | 1/2003 | Donovan et al. | |
| 6,553,112 B2 | 4/2003 | Ishikawa et al. | |
| 6,636,831 B1 * | 10/2003 | Profit et al. | 704/275 |

(Continued)

OTHER PUBLICATIONS

Lin et al., (1999). "A distributed architecture for cooperative spoken dialogue agents with coherent dialogue state and history." In: Proc. Workshop Automatic Speech Recognition and Understanding.*

(Continued)

*Primary Examiner* — Edgar Guerra-Erazo

(57) ABSTRACT

A method of processing a call in a voice-command platform includes a step of transferring the call from the voice-command platform to a second voice-command platform. The method continues with the step of transmitting, either directly or indirectly, grammar information from the voice command platform to the second voice-command platform for use by a voice command application executing in the second voice-command platform in processing the call. The grammar information could be logic defining application-level grammar or system-level grammar. Alternatively, the grammar information could be a network address (e.g., URI or URL) where the grammar is stored in a file, e.g., a VXML document. The features of this invention enhance the user experience by preserving and using grammars used initially in the first voice command platform in other, downstream, voice command platforms.

22 Claims, 4 Drawing Sheets

(56) References Cited

U.S. PATENT DOCUMENTS

| | | | |
|---|---|---|---|
| 6,985,865 B1* | 1/2006 | Packingham et al. | 704/275 |
| 7,003,079 B1* | 2/2006 | McCarthy et al. | 379/32.01 |
| 7,039,166 B1* | 5/2006 | Peterson et al. | 379/88.18 |
| 7,177,402 B2* | 2/2007 | Metcalf | 379/88.03 |
| 7,231,636 B1* | 6/2007 | Evans | 717/127 |
| 7,263,177 B1* | 8/2007 | Paterik et al. | 379/88.18 |
| 7,313,525 B1* | 12/2007 | Packingham et al. | 704/270 |
| 7,460,652 B2* | 12/2008 | Chang | 379/88.18 |
| 7,603,433 B1* | 10/2009 | Paterik | 709/217 |
| 7,698,435 B1* | 4/2010 | Paterik et al. | 709/227 |
| 7,751,384 B1* | 7/2010 | Paterik | 370/352 |
| 7,769,159 B1* | 8/2010 | Paterik | 379/245 |
| 7,903,792 B2* | 3/2011 | Balentine et al. | 379/76 |
| 8,140,904 B2* | 3/2012 | Kesireddy | 714/33 |
| 8,499,196 B2* | 7/2013 | Kesireddy | 714/33 |
| 2002/0128908 A1* | 9/2002 | Levin et al. | 705/14 |
| 2003/0007609 A1 | 1/2003 | Yuen et al. | |
| 2003/0144846 A1* | 7/2003 | Denenberg et al. | 704/277 |
| 2004/0120473 A1* | 6/2004 | Birch et al. | 379/88.17 |
| 2004/0172254 A1* | 9/2004 | Sharma et al. | 704/270.1 |
| 2005/0033582 A1* | 2/2005 | Gadd et al. | 704/277 |
| 2005/0043952 A1* | 2/2005 | Sharma et al. | 704/270.1 |
| 2005/0074113 A1* | 4/2005 | Mathew et al. | 379/265.02 |
| 2005/0137874 A1* | 6/2005 | Da Palma et al. | 704/270.1 |
| 2005/0192809 A1* | 9/2005 | Dodrill et al. | 704/270.1 |
| 2007/0027692 A1* | 2/2007 | Sharma et al. | 704/270.1 |
| 2007/0265831 A1* | 11/2007 | Dinur et al. | 704/10 |
| 2011/0107147 A1* | 5/2011 | Kesireddy | 714/33 |
| 2012/0137177 A1* | 5/2012 | Kesireddy | 714/32 |

OTHER PUBLICATIONS

U.S. Application of Paterik et al., U.S. Appl. No. 10/888,201, filed Jul. 9, 2004.

* cited by examiner

TRANSFERRING VOICE COMMAND PLATFORM (VCP) FUNCTIONS AND/OR GRAMMAR TOGETHER WITH A CALL FROM ONE VCP TO ANOTHER

BACKGROUND

1. Field of the Invention

The present invention relates to telecommunications systems that process speech input from a user with a computer. More particularly, the invention relates to methods for transferring voice command functions including application-level grammars and system-level grammars from a first voice command platform to a second voice command platform. The method enhances the user experience by increasing the likelihood of the second voice command platform correctly interpreting the speech input from the user and by increasing the likelihood of executing the event that the user intended.

2. Description of Related Art

A voice command platform (VCP) is a computer-implemented system that provides an interface between speech communication with a user and voice command applications. Generally, a person can call the voice command platform from any telephone and by speaking commands, can browse through voice command applications and menu items within the voice command application. The voice command platform allows the user to access and interact with information maintained by the voice command applications.

The voice command platform can thus receive spoken commands from the user and use the commands to guide its execution of voice command applications, and the voice command platform can interact with a user as dictated by logic in the voice command applications. The voice command platform includes a browser in order for the voice command platform to execute the logic defined by the voice command application. The browser includes an interpreter which functions to interpret the logic (such as in VoiceXML documents) so as to allow the voice command platform to effectively communicate with a user through speech.

A voice command application can be written or rendered in any of a variety of computer languages. One such language is VoiceXML (or simply "VXML"). VoiceXML is an XML-based markup language defined through the W3C consortium. VoiceXML is used to create voice user interfaces. VXML is a tag-based language similar to Hyper Text Markup Language (HTML) that underlies most Internet web pages. Other analogous languages, such as SpeechML, VoxML, or SALT (Speech Application Language Tags), for instance, are available as well.

A voice command application will usually specify which words or "grammars" a user can speak in response to a prompt. In order to identify words in the incoming speech, the voice command platform includes a speech recognition (SR) engine. The SR engine will typically include or have access to a pronunciation dictionary database of "phonemes," which are small units of speech that distinguish one utterance from another. The SR engine will then analyze the waveform represented by the incoming digitized speech signal and, based on the dictionary database, will determine whether the waveform represents particular words, i.e., acceptable "grammar".

For instance, if a voice command application allows for a user to respond to a prompt with the grammars "sales," "service" or "operator", the SR engine may identify the sequence of one or more phonemes that makes up each of these grammars respectively. The SR engine may compare a phoneme representation of the spoken utterance to a phoneme representation of each allowed grammar. Once the SR engine finds a match (or a best match), the voice command platform may continue processing the application in view of the user's spoken response.

An application written in VoiceXML can be accessed through a VoiceXML interpreter otherwise known as a voice browser. Grammar is typically specified at the application level. The voice browser also has browser-level grammar. The grammar, at both browser and application levels, consists of a set of individual grammar elements. The global grammar elements in the voice browser are assigned to specific tasks, which are handled by event handling routines consistently across all applications. Each spoken grammar is associated with a particular response or reaction. The response can include accessing certain XML documents or linking to different voice command platforms.

Consider for example a user calling into a first voice command platform that functions as a central agent for receiving and processing orders for fresh flowers. The first voice command platform is created and managed by a flower company. The user provides spoken information as to name and address of the recipient, the type of flowers, the date of delivery, etc., in response to voice prompts. At some point they may be prompted to indicate the manner of shipping. Suppose, in response to the prompt, they speak "FEDEX". FEDEX is a global grammar element in the first voice command platform that is associated with a link to the FEDEX delivery service voice command platform. Thus, in response to the spoken grammar FEDEX, the flowers voice command platform transfers the call to the FEDEX voice command platform for the user to make their delivery arrangements. This way, the shipping company FEDEX can control the user experience when a person makes arrangements to use that company's services.

As another example, consider the situation where the user provides their flower order and is asked whether they wish to include a card. The user might be prompted to speak "HALLMARK" if they want to include a card with the flowers. The speech HALLMARK is also a global grammar element which has a reaction of a transfer of the call to the Hallmark Greeting Card company voice command platform for ordering a greeting card.

Later in the call, the caller could be transferred back from VCP2 to VCP1, e.g., to change the flower order, or to further, downstream VCPs (such as the VCP of the shipping company after ordering flowers and a card, or to the VCP of a candy company such as Whitman Chocolates to order candy with their flowers). These transfers between voice command platforms are generally designed to be as smooth and transparent as possible to the user.

A problem can occur in this arrangement, however: if the system-level grammars or root-level grammars on VCP2 do not include or function in the same way as the system-level grammars or root-level grammars on VCP1, then the user may suddenly no longer be able to invoke functions that the user was previously able to invoke, or the user may suddenly no longer be able to invoke those functions by speaking the same grammars.

Consider the example of VCP1 (the flowers company voice command platform) that defines the system-level grammar "HALLMARK" that a user could speak in order to navigate to a greeting card provider. Consider further that the caller transferred first to the FEDEX voice command platform for shipping arrangements (VCP2). The FEDEX VCP may not recognized the global grammar element HALLMARK (since it is a shipping company and not a flower company). If the user were to speak HALLMARK while their call is being handled by the FEDEX VCP in order to attempt to also include a card with their order, the FEDEX VCP would not recognize the grammar and would give an out-of-grammar error message.

Consider also the possible situation where the flower customer interacts with the flower company voice command platform and orders flowers, and then orders a card by speaking HALLMARK in response to a prompt. They are now transferred to the Hallmark Greeting Card company voice command platform. If they were to speak the term FEDEX, the speech FEDEX might not be recognized in the Hallmark Greeting Card voice command platform. As another example, if, while they are at the Hallmark voice command platform, they were to speak "LOCAL DELIVERY" e.g. to have the order of card plus flower special delivered by a local florist near the recipient, the Hallmark voice command platform may not recognize it.

There is a need in the art to meet user expectations in terms of recognizing speech input when a call is transferred from one voice command platform to another. There is a need for consistency across diverse voice command platforms that have different global grammar due to their different services, features, and functions. The present invention helps improve the user experience and allow their expectations to be met by providing methods and systems for transferring voice command platform functions and grammars from one voice command platform to another. For example, when the user is transferred from the flowers voice command platform to the greeting card voice command platform, the transfer is accompanied by a transfer of the global grammar elements FEDEX, LOCAL DELIVERY, BOUQUET, GREETING CARD, CANDY and other global grammar elements that the user would expect to be there while they are completing their flower order, regardless of the fact that they were have been transferred out of the flower voice command platform to a greeting card or shipping company voice command platform. This transfer could also be accompanied by context information such as the particular location in the menu of the first voice command platform they were at when the transfer occurred, so that when they are transferred back they are transferred back to the location where they were at the time of the transfer.

SUMMARY

In a first aspect, a method is provided of processing a call in a voice-command platform, comprising the steps of: transferring the call from the voice-command platform to a second voice-command platform; and transmitting, either directly or indirectly, grammar information from the voice command platform to the second voice-command platform for use by a voice command application executing in the second voice-command platform in further processing the call. In one possible embodiment, the voice command platform transfers a network address, e.g., Uniform Resource Identifier, wherein the second voice command platform may download grammar for use in processing the call at the second voice command platform. Such grammar could be system level grammar, application level grammar, or both. In another possible embodiment, the grammar information transmitted to the second voice command platform comprises a file containing the grammar information. The file may take the form of a VXML document containing system level grammar, application level grammar or both.

Other types of voice command platform functions or information may be transmitted to the second voice command platform, including destinations (network addresses, e.g., URIs) where the second voice command platform may access VXCM documents, phone numbers, or other information pertinent to the call, and prompts, announcements or other information that may be used by voice command platforms executing on the second voice command platform, and context information.

BRIEF DESCRIPTION OF THE DRAWINGS

in FIG. 4 the information itself is transferred directly, in FIG. 4 the information is transferred as network addresses where the second voice command platform may access the information via a network resource storing the information.

DETAILED DESCRIPTION OF PREFERRED EMBODIMENT

This patent will firstly explain the design and operation of a representative voice command platform that may be used in carrying out the invention, and then proceed to a more detailed discussion of the manner in which grammar information and other voice command functions may be transferred between voice command platforms in accordance with a primary aspect of this invention.

I. Voice Command Platform Design

Figure 1:
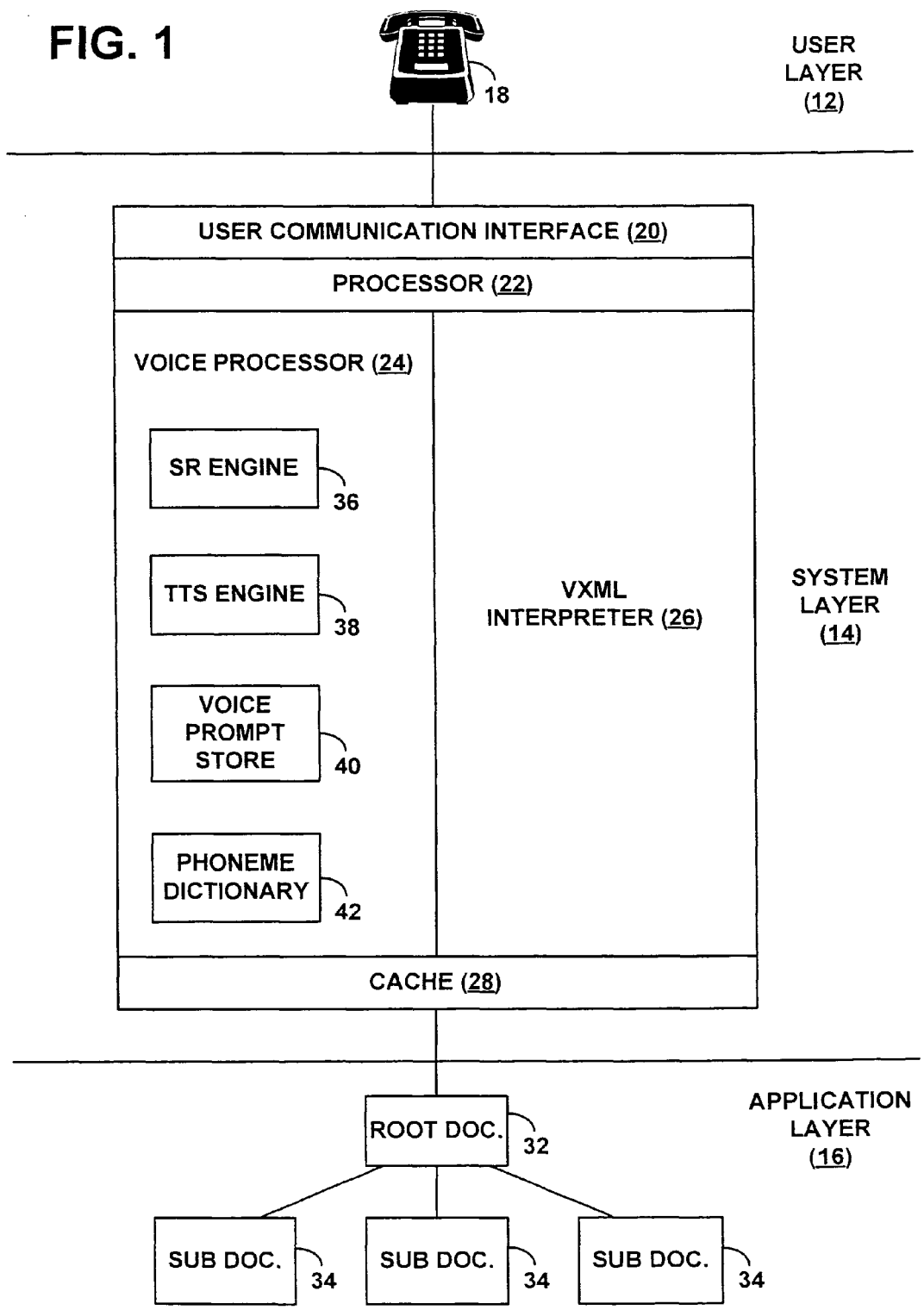
FIG. 1 is a functional block diagram of a representative voice command platform system which can be used in this invention.

A representative voice command platform is shown in FIG. 1 and will be described in detail below. Basically, the system of FIG. 1 provides an interface between speech communication with a user and computer-executed voice command applications (or, more generally, "logic"). A person can call an exemplary voice command platform from any telephone or similar device and, by speaking commands, can browse through navigation points (e.g., applications and/or menus items within the applications) to access and communicate information. The voice command platform can thus receive spoken commands from the user and use the commands to guide its execution of voice command applications, and the voice command platform can "speak" to a user as dictated by logic in voice command applications. Systems such as shown in FIG. 1 are known in the art and the novelty of this invention resides in the manner of transferring grammar and other information between voice command platforms, not in the design of the voice command platform itself.

For instance, a person may call a voice command platform, and the platform may apply a voice command application that causes the platform to speak to the user, "Hello. Would you like to hear a weather forecast, sports scores, or stock quotes?" In response, the person may state to the platform, "weather forecast." Given this response, the application may cause the platform to load and execute a subsidiary weather forecasting application. The weather forecasting application may direct the platform to speak another speech prompt to the person, such as "Would you like to hear today's weather or an extended forecast?" The person may then respond, and the weather forecasting application may direct the voice command platform to execute additional logic or to load and execute another application based on the person's response.

A robust voice command platform may therefore be able to (i) receive and recognize speech spoken by a user and (ii) provide speech to a user. The platform can achieve these functions in various ways.

On the incoming side, for instance, the platform may include an analog-to-digital (A-D) converter in the voice processor 24 for converting an analog speech signal from a user into a digitized incoming speech signal. (Alternatively, the user's speech signal might already be digitized, as in a voice-over-IP communication system, for instance, in which case A-D conversion would be unnecessary). The platform may then include a speech recognition (SR) engine 36, which functions to analyze the digitized incoming speech signal and to identify words in the speech. The SR engine will typically be a software module executable by a processor.

As noted above, a voice command application will usually specify which words or "grammar" a user can speak in response to a prompt, for instance. Therefore, the SR engine will seek to identify one of the possible spoken responses.

In order to identify words in the incoming speech, the SR engine will typically include or have access to a dictionary database of "phonemes," which are small units of speech that distinguish one utterance from another. The SR engine will then analyze the waveform represented by the incoming digitized speech signal and, based on the dictionary database, will determine whether the waveform represents particular words.

For instance, if a voice command application allows for a user to respond to a prompt with the grammar elements "sales," "service" or "operator", the SR engine may identify the sequence of one or more phonemes that makes up each of these grammars respectively. The SR engine may then analyze the waveform of the incoming digitized speech signal in search of a waveform that represents one of those sequences of phonemes. (That is, the SR engine may compare a phoneme representation of the spoken utterance to a phoneme representation of each allowed grammar.) Once the SR engine finds a match (or a best match), the voice command platform may continue processing the application in view of the user's spoken response.

Additionally, the SR engine or an ancillary module in the voice command platform may function to detect DTMF tones dialed by a user and to convert those DTMF tones into representative data for use in the execution of a voice command application. Thus, for instance, a voice command application might define a particular DTMF grammar as an acceptable response by a user. Upon detection of that DTMF grammar, the platform may then apply associated logic in the application.

On the outgoing side, the voice command platform may include a text-to-speech (TTS) engine 38 for converting text into outgoing digitized speech signals. The platform may include a digital-to-analog (D-A) converter for converting the outgoing digitized speech signals into audible voice that can be communicated to a user. (Alternatively, the platform might output the digitized speech signal itself, such as in a voice-over-IP communication system).

A voice command application may thus specify text that represents voice prompts to be spoken to a user. When the voice command platform encounters an instruction to speak such text, the platform may provide the text to the TTS engine. The TTS engine may then convert the text to an outgoing digitized speech signal, and the platform may convert the signal to analog speech and send it to the user. In converting from text to speech, the TTS engine may also make use of the dictionary database of pronunciation ("pronunciation dictionary"), so that it can piece together the words (and pieces of words) that make up the designated speech.

Also on the outgoing side, a voice command platform may include a set of stored voice prompts, in the form of digitized audio files (e.g., *.wav files) for instance. These stored voice prompts, each of which may have a network address, would often be common prompts, such as "Hello", "Ready", "Please select from the following options", or the like. Each stored voice prompt will typically have an associated label (e.g., a network address under which the prompt is stored). By reference to the label, a voice command application might then specify that the voice command platform should play the prompt to a user. In response, the voice command platform may retrieve the audio file, convert it to an analog waveform, and send the analog waveform to the user.

A voice command application can reside permanently on the voice command platform (e.g., as a logical component of the platform), or it can be loaded dynamically into the platform. For instance, the platform can include or be coupled with a network or storage medium that maintains various voice command applications. When a user calls the platform, the platform can thus load an application from the storage medium and execute the application. Further, in response to logic in the application (such as logic keyed to a user's response to a menu of options), the platform can load and execute another application. In this way, a user can navigate through a series of applications and menus in the various applications, during a given session with the platform.

A voice command application can be written or rendered in any of a variety of computer languages. One such language is VoiceXML (or simply "VXML"), which is a tag-based language similar the HTML language that underlies most Internet web pages. (Other analogous languages, such as SpeechML and VoxML for instance, are available as well.) By coding a voice command application in VXML, the application can thus be made to readily access and provide web content, just as an HTML-based application can do. Further, when executed by the voice command platform, the VXML application can effectively communicate with a user through speech.

An application developer can write a voice command application in VXML. Alternatively, an application developer can write an application in another language (such as Java, C, C++, etc.), and the content of that application can be rendered in VXML. (For instance, when the platform loads an application, the platform or some intermediate entity could transcode the application from its native code to VXML.)

In order for a voice command platform to execute a VXML application or other tag-based application, the platform should include a VXML browser or "interpreter." The VXML interpreter functions to interpret tags set forth in the application and to cause a processor to execute associated logic set forth in the application.

A VXML application can be made up of a number of VXML documents and other objects, just like an HTML web site can made up of a number of HTML pages and objects. A VXML application that is made up of more than one document should include a root document, somewhat analogous to an HTML home page. According to VXML, the root document defines variables that are available to all subsidiary documents in the application. Whenever a user interacts with documents of a VXML application, the root document of the application is also loaded. Therefore, variables defined in the root document should be available during execution of any of the documents of the application.

Customarily, each VXML document will include a <vxml> tag to indicate that it is a VXML document. It may then include a number of <form> sections that can be interactive (e.g., prompting a user for input) or informational (e.g., simply conveying information to a user.) Within a given form, it may further include other executable logic.

A VXML document can also define application-level grammars as described above. In particular, VXML grammars are words or terms that the VXML application will accept as input during execution of the application. The VXML document may expressly list the allowed grammars, or it may reference a file or other network object that defines the allowed grammars (just as an HTML document can reference another file). When a VXML application is executed on a voice command platform, the platform may provide the SR engine with an indication of the grammars that the VXML application will accept. Once the SR engine detects that a user has spoken one of the grammars, the platform may then apply that grammar as input to the VXML application, typically proceeding to execute a set of logic (e.g., a link to another document) in response.

For example, a VXML document can define, as grammars, a number of possible options, as well as a number of possible words or phrases that a user can speak to select those options. For instance, a document might define as options of clothing the items "hat", "shirt", "pants" and "shoes". In turn, the document might define the following as acceptable grammars for the "hat" option: "hat", "visor", "chapeaux" and "beret".

A VXML document or other voice command application can define a set of grammars in various ways. For instance, the grammar set could be defined using a well known coded language such as GSL (by Nuance of Menlo Park, Calif.), SRGS (by W3C, as described on the World Wide Web at www.w3.org/TR/speech-grammar/) or BNF (by Speech-Works), which the voice command platform can translate into, or understand to represent, a particular phoneme or combination of phonemes. Thus, when faced with an utterance from a user, the platform can compare a phoneme representation of the utterance with a phoneme representation of each allowed grammar, in order to find a best match.

In a typical arrangement, grammars defined in the root document of a VXML application are, by default, available for use in all of the subsidiary documents of the application. Thus, when a voice command platform is executing a VXML application, if a user speaks a grammar that is defined in the root document of the application, the voice command platform would responsively execute the logic that accompanies that grammar in the root document of the application.

In a voice command platform, each navigation point may have a respective identifier or label. For example, each voice command application can have a respective label, such as a network address where the application is maintained. And as another example, a voice command application can define a number of successive menus through which a user can browse, and each menu might have a respective label by which it can be referenced. A voice command platform can use these labels to move from application to application or from menu item to menu item, just as hyperlinks operate to cause a browser to move from one web page (or component of one web page) to another.

In VXML, for instance, each VXML document will have a respective Universal Resource Identifier (URI), which is akin to (or a generalization of) a Universal Resource Locator (URL) used to identify the network location of an HTML page. A given VXML document may thus define logic that instructs the voice command platform to load and execute another VXML document or some other object from a designated URI. For instance, a VXML document may indicate that, if a user speaks a particular grammar, the platform should load and execute a particular VXML document from a designated URI, but that, if the user speaks another grammar, the platform should load and execute another VXML document from another designated URI.

Referring now in more particular to the drawings, FIG. 1 is a functional block diagram illustrating the layers of a voice command platform or system in which the exemplary embodiment can be employed, continuing with the networked voice command platform example.

As shown in FIG. 1, the system may be considered to include three layers, (i) a user layer 12, (ii) a platform or system layer 14, and (iii) an application layer 16. The user layer 12 provides a mechanism 18, such as a telephone, for a person to communicate by voice with the platform. The system layer 14, in turn, includes a user communication interface 20, a processor 22 (i.e., one or more processors), a voice-processing module 24, a VXML interpreter module 26, and cache 28. The application layer 16 then defines an application 30, which may be made up of a root document 32 and subsidiary documents 34 that can be loaded into cache 28 and executed by processor 22, i.e., by the voice command platform.

User communication interface 20 may take various forms. For example, the user communication interface can provide a circuit or packet interface with a telecommunications network (such as the PTSN or the Internet, either of which may provide connectivity to one or more users via at least one wireless communications link—such as a cellular communication system for instance). The communication interface may, in turn, include an A-D and D-A converter (not shown) as described above, for converting between analog signals on the user side and digital signals on the platform side. Processor 22 then sends and receives communications via user communication interface 20.

Voice-processing module 24 and VXML interpreter module 26 preferably define program instructions that can be executed by processor 22 and data that can be referenced by the processor, to carry out voice processing functions. All of this program logic can be stored in suitable data storage, such as ROM or a disk drive for example.

For instance, voice-processing module 24 preferably defines an SR engine 36 and a TTS engine 38, as well as a voice prompt store 40. Further, voice-processing module 24 may include a phoneme dictionary 42 that the processor can reference to facilitate operation of the SR engine and the TTS engine as noted above. VXML interpreter module 26, in turn, may facilitate execution of application 30, such as by interpreting tags in the application.

Cache 28 functions to temporarily hold application 30 (or one or more documents of the application) when processor 22 is executing the application. Thus, in operation, processor 22 may retrieve application 30 from a designated URI on the Internet (or elsewhere) and may load the application into cache 28. The processor may then execute the application, using VXML interpreter 26 to interpret tags, using TTS engine 38 and voice prompt store 40 to send speech to a user, and using SR engine 36 to recognize speech spoken by a user.

It should be understood that that this and other arrangements described herein are set forth for purposes of example only. As such, those skilled in the art will appreciate that other arrangements and other elements (e.g., machines, interfaces, functions, orders and groupings of functions, etc.) can be used instead, and some elements may be omitted altogether. Further, as in most telecommunications applications, those skilled in the art will appreciate that many of the elements described herein are functional entities that may be implemented as discrete or distributed components or in conjunction with other components, and in any suitable combination and location.

For example, although the voice command system is shown to include a VXML interpreter, the system may include another type of voice browser. Alternatively, the system might not be browser-based at all. In that event, some of the functions described herein could be applied by analogy in another manner, such as through more conventional interactive voice response (IVR) processing.

As another example, although the application layer 16 is shown separately from the system layer 14, the application layer could be integrated in whole or in part with the system layer. For instance, a voice command application could be defined by logic resident permanently on the voice command platform and/or by logic downloaded to the voice command platform. Other variations are possible as well.

Figure 2:
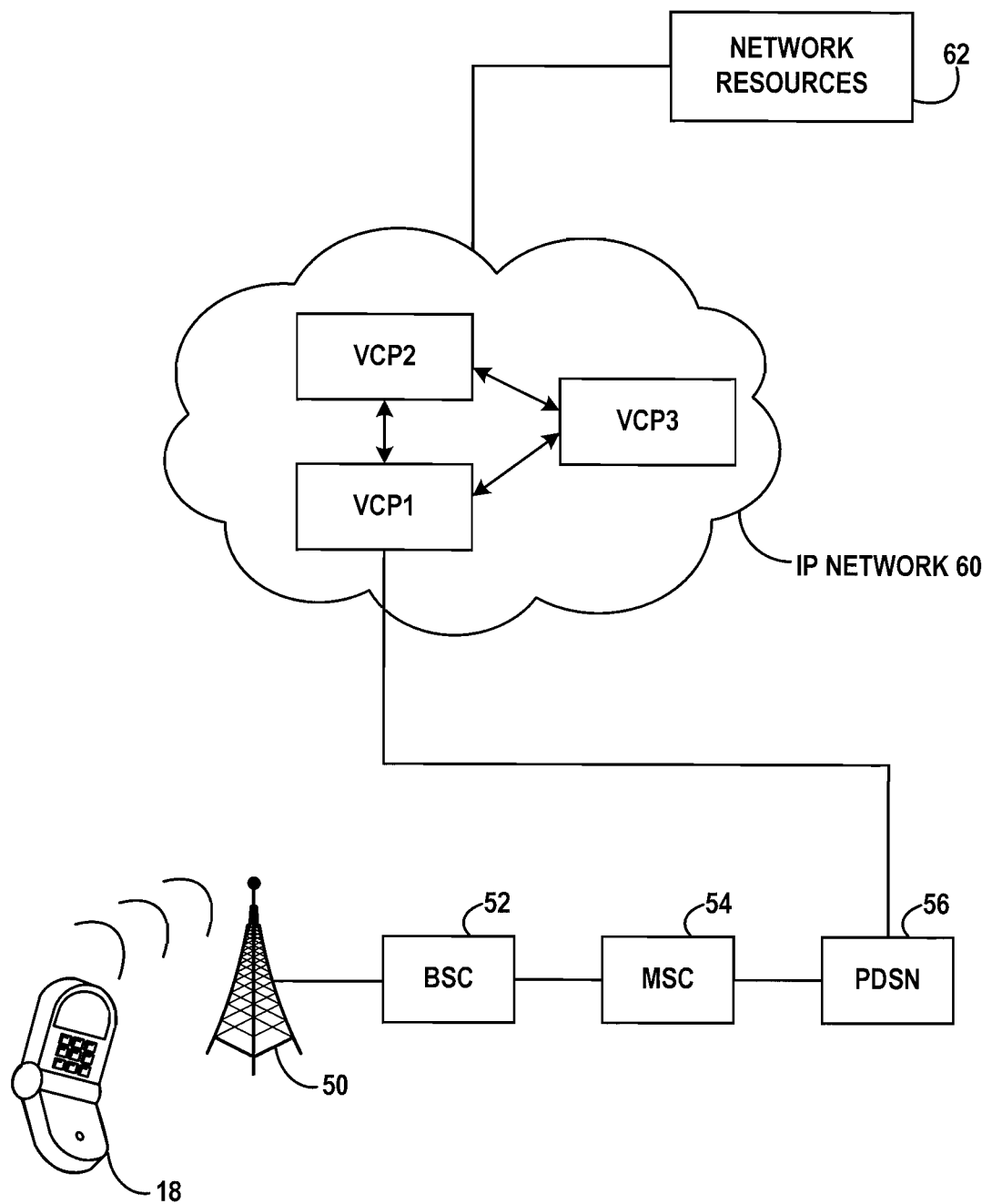
FIG. 2 is a network diagram showing multiple voice command platforms; a call from the telephone 18 could be transferred among these or the voice command platforms.

II. Transfer of Voice Command Functions Such as Grammar Between Voice Command Platforms FIG. 2 shows an environment in which this invention can be carried out. As noted above, a call can be transferred from one voice command platform VCP1 (such as shown in FIG. 1) to another voice command platform VCP2 (which could also take the form of FIG. 1) in the course of a user interacting with the first voice command platform.

The actual transfer of a call from one VCP to another can be accomplished through use a variety of signaling mechanism, including the use of Signalling System 7 (SS7) agents, call forwarding techniques, or more preferably using the Call Control XML (CCXML) standard specified by the W3C Consortium, available on-line at http://www.w3.org/TR/ccxml/. The content of the CCXML specification is incorporated by reference herein. Basically, CCXML is designed to complement VoiceXML by providing advanced telephony functions. It also can be used as a third-party call control manager in any telephony system. The CCXML standard contains references to VoiceXML's capabilities and limitations, as well as details on how VoiceXML and CCXML can be integrated. The CCXML specification originated from the desire to handle call control requirements that were beyond the scope of the VoiceXML specification.

According to a principal aspect of this invention, when the first voice command platform VCP1 transfers a call to VCP2, VCP1 will also transfer some logic, such as system-level grammars and/or root-level grammars, to VCP2. VCP2 may then apply that logic as it interacts with the user, thereby providing the user with a more seamless experience, notwithstanding the transfer from VCP1 to VCP2.

The phone 18 in this instance is a cellular phone that communicates with VCP1 via a wireless service provider infrastructure consisting of a base station antenna 50, base station controller 52, mobile switching center 54 and packet data serving node 56. These elements are conventional and need not be described further. Packet data serving node 56 connects wireless phone 18 to a packet switched network shown as IP network 60, which may for example be the wireless service provider backbone network. Voice command platforms VCP1 and VCP2 could be placed anywhere in the IP network 60 and need not be located on the same physical network or even in the same region or network. The IP network provides means for the voice command platforms to access network resources 62, which could be any network resource for any purpose. For example, the network resource 62 could be files on a server containing voice prompts, VXML documents, etc.

In an exemplary arrangement, VCP1 and VCP2 may both be situated on a packet-switched network, such as a telecom carrier's core packet network for instance. This is often the arrangement in any event, because many VCPs these days are VXML based, and so the VCPs have access to a packet-switched network through which they can download VXML voice command applications (a/k/a "documents"), e.g. from the network resource 62.

When (before, at the time of, or after) VCP1 transfers the call to VCP2, VCP1 will send to VCP2 (i) a call identifier identifying the call and (ii) a set of logic or a reference to a set of logic that comprises the grammar information pertinent to the call, such as application-level grammar or system-level grammar. The call identifier can be as simple as the user's phone number, which VCP1 would have received through conventional caller-ID mechanisms, or the call identifier could take some other form.

Figure 3:
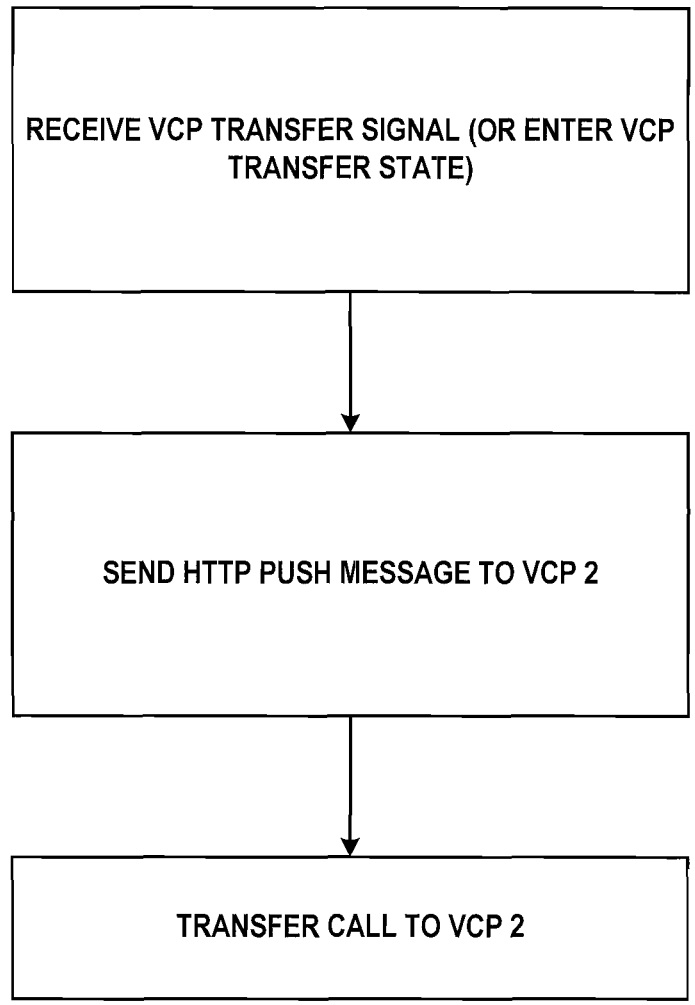
FIG. 3 is a flow chart showing one representative method for transferring grammar or other information between voice command platforms.

FIG. 3 shows one possible embodiment in flow-chart form. At step 70, VCP 1 receives a VCP transfer signal from the user (e.g. by virtue of a spoken command from the user) or otherwise enters a VCP transfer state. At step 72, an HTTP push message containing grammar information and any other applicable voice command functions (e.g., prompts) is generated at VCP1 and sent to VCP2. At step 74, the call is transferred from VCP1 and VCP2 and VCP2 uses the transferred information in processing of the call.

The HTTP push message in FIG. 3 could include set of logic in the form of a VXML document that defines some or all of the system-level grammars that were in place on VCP1 and/or some or all of the application-level (e.g. root-level) grammars that were being executed by VCP1. The system-level grammars on a VXML-based VCP may be defined in a system-level VXML document, so the set of logic could be that VXML document or some variant thereof. The root-level grammars would similarly be defined in a VXML document, so the set of logic could be that VXML document instead. A reference to the set of logic could be a network address (e.g., a URL) of a network location where the logic is stored, or it could take some other form. If VCP1 sends a network address of the logic, VCP2 can get the logic from that network address.

VCP1 can send the call identifier and logic or reference to VCP2 in various ways. If the VCPs are VXML based, they would likely already be programmed with HTTP logic. Therefore, one way to send this information from VCP1 to VCP2 is with an HTTP PUSH message containing the grammar information. Another way to send the information is with a short messaging service (SMS) message. Still another way is to send the information is with a simple UDP or TCP packet destined to a port at VCP2 that is arranged to receive such messages from other voice command platforms and include in the packet a network address (URI) comprising a link to a VXML document containing grammar information and other voice command functions. Yet another way might be via signaling system 7 (SS7) techniques or a hybrid or blend of SS7, SMS, HTTP PUSH message or other technique. Still other ways may be used, and the details on the particular manner by which call identifiers and grammar information is transferred is not considered particularly important.

When VCP2 receives the information from VCP1, VCP2 will use the call identifier as a basis to correlate the newly received logic with the user's call. To do so, for instance, the application executed by VCP2 could include in it a reference to or incorporation of the newly received logic, making the newly received logic a subsidiary root-level document for the application. More particularly, in a VXML scenario for instance, the application could reference and incorporate "SubRoot.VXML" as a subsidiary root-level document, and VCP2 can simply store the newly received VXML document under the name "SubRoot.VXML" so that the application would consider it to be a subsidiary root-level document. The concept of root-level VXL documents exists in the VXML specification (available on-line from the W3C consortium at http://www.w3.org/TR/voicexml20/), and thus existing standards can be used in one possible embodiment of the invention.

The logic transferred from VCP1 to VCP2 may include a number of different information. Suppose, for example, VCP1 sends a VXML document to VCP2. Such VXML document could contain fields with the following information: grammars (system level and/or application level); destinations (network addresses) pertaining to the grammars; called party information; the call sequence or prompts previously navigated at VCP1 during the call; URI's for particular prompts; previous VCP's in the call history; and any others that might be useful for the receiving VCP in processing the call.

As noted above, the calls can be transferred from VCP2 to VCP3, and from VCP3 to VCP4, etc., and possibly back to VCP1. The techniques described herein are applicable to any transfer between voice command platforms, whether to new voice command platforms or in transfers back to previously invoked VCPs.

Figure 4:
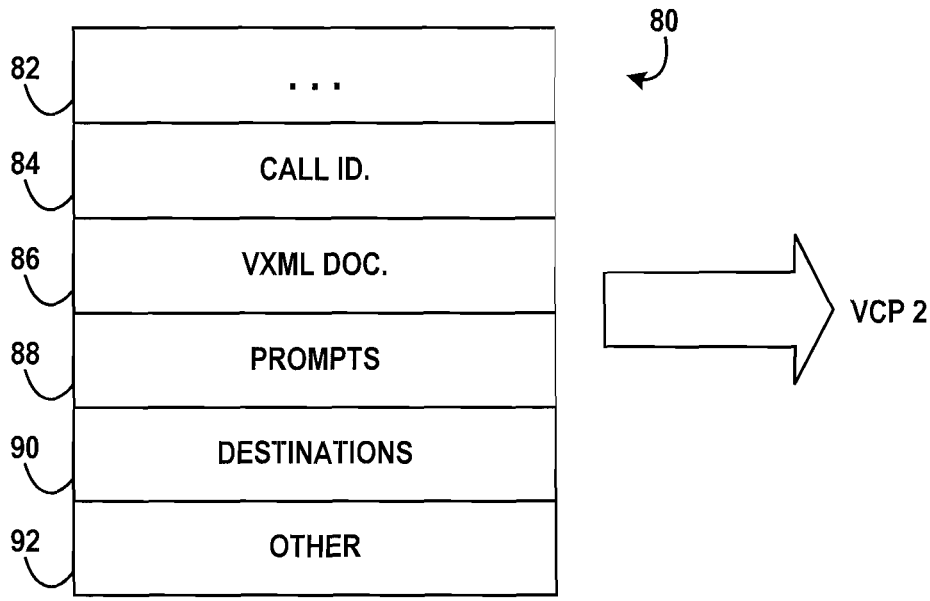
FIGS. 4 and 5 show two types of packets that can be used to transfer the information in FIG. 3.

FIG. 4 shows an example of a HTTP push message that could be sent from VCP1 to VCP2. The message is shown as a packet 80 which could include applicable TCP/IP/UDP headers in field 82 (the details of which are not important), a field 84 containing call identification information, a field 86 containing one or more VXML documents containing grammar information, a field 88 containing prompts, a field 90 containing destinations, and other fields 92 containing other applicable VCP functions, such as call path or history, phone numbers etc.

Figure 5:
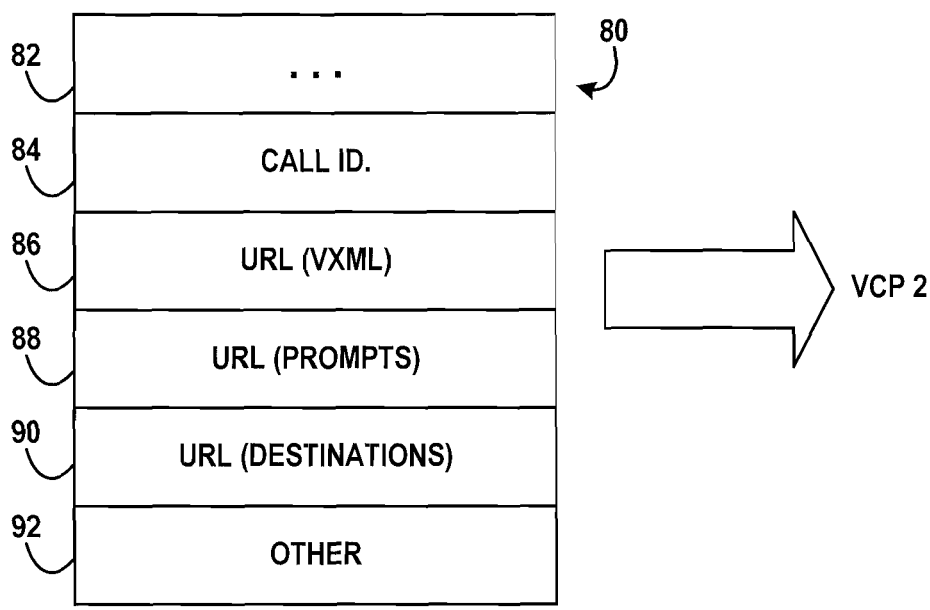

FIG. 5 shows another possible example for the packet 80 in which the fields 86, 88, 90 and 92 contain network addresses for the grammar and other voice command platform functions, in which case the receiving voice command platform downloads the applicable documents or information from the network resources 62 (FIG. 2) hosting these URLs.

While a technique has been described herein of transferring the grammar information and other voice command platform directly, e.g., in the form of VMXL document transmitted from one VCP to another VCP, the concept of transferring grammar information and other voice command functions is intended to cover the transfer of a network address or link (e.g., URI of a VXML document), whereupon receipt of the network address at the second VCP the document is downloaded and used by the recipient VCP for use in processing the call.

It is possible that a conflict may exist between the new application of system level grammar transferred to the second voice command platform and the existing grammar (either at the application or system level) at the second voice grammar. Methods of resolving conflict between application and system level grammar are disclosed in pending U.S. patent application Ser. No. 10/680,961 filed Oct. 7, 2003, the contents of which are incorporated by reference herein.

Modification and variation from the disclosed embodiments is contemplated without departure from the scope of the invention. This scope is to be determined by reference to the appended claims.

The invention claimed is:

1. A method of processing a call in a voice-command platform, comprising the steps of:

transferring the call from the voice-command platform to a second voice-command platform; and transmitting, either directly or indirectly, grammar information from the voice command platform to the second voice-command platform for use by a voice command application executing in the second voice-command platform in processing the call, the grammar information comprising information as to allowed spoken utterances from a user in response to a prompt.

2. The method of claim 1, wherein the transferring step comprises the step of transferring a network address wherein the second voice command platform may download grammar for use in processing the call at the second voice command platform.

3. The method of claim 1, wherein the grammar information comprises at least one of a system-level grammar and an application-level grammar.

4. The method of claim 1, wherein the transferring step comprises the step of transferring a file containing the grammar information.

5. The method of claim 4, wherein the file comprises a VXML document.

6. The method of claim 5, wherein the VXML document comprises at least one of a system-level grammar and an application-level grammar.

7. The method of claim 3, wherein grammar information comprises system-level grammar defined for the voice command platform.

8. The method of claim 3 wherein the grammar information comprises application-level grammar defined for an application executing on the voice command platform.

9. The method of claim 1, wherein the transferring step further comprises the transferring of a network address of a root document associated with the call.

10. The method of claim 1, wherein a voice command application executing on the second voice command platform incorporates the grammar information as a subsidiary root-level document and uses the subsidiary root level document in processing the call at the second voice command platform.

11. The method of claim 1, further comprising the step of transferring, from the voice command platform to the second voice command platform, information as to at least one of: prompts and destinations used at the voice command platform for the call.

12. In a voice command platform system wherein the improvement comprising:

a processor executing instructions for transferring a call from the voice command platform to a second voice command platform, wherein the instructions transmit, either directly or indirectly, grammar information from the voice command platform to the second voice-command platform for use by a voice command application executing in the second voice-command platform in processing the call, the grammar information comprising information as to allowed spoken utterances from a user in response to a prompt.

13. The improvement of claim 12, wherein the instructions cause the voice command platform to transfer a network address wherein the second voice command platform may download grammar for use in processing the call in the second voice command platform.

14. The improvement of claim 12, wherein the grammar information comprises at least one of a system-level grammar and an application-level grammar.

15. The improvement of claim 12, wherein the transferring step comprises the step of transferring a file containing the grammar information.

16. The improvement of claim 15, wherein the file comprises a VXML document.

17. The improvement of claim 16, wherein the VXML document comprises at least one of a system-level grammar and an application-level grammar.

18. The improvement of claim 14, wherein the grammar information comprises system-level grammar defined for the voice command platform.

19. The improvement of claim 14, wherein the grammar information comprises application-level grammar defined for an application executing on the voice command platform.

20. The improvement of claim 12, wherein the improvement further comprises transferring a network address of a root document associated with the call.

21. The improvement of claim 12, wherein a voice command application executing on the second voice command platform incorporates the grammar information as a subsidiary root-level document and uses the subsidiary root level document in processing the call at the second voice command platform.

22. The improvement of claim 12, wherein the instructions further transfer, from the voice command platform to the second voice command platform, information as to at least one of: prompts and destinations used at the voice command platform for the call.

* * * * *